United States Patent
Kim et al.

(10) Patent No.: US 11,407,858 B2
(45) Date of Patent: *Aug. 9, 2022

(54) POLYAMIDE-IMIDE RESIN FILM

(71) Applicant: LG CHEM, LTD., Seoul (KR)

(72) Inventors: Byungguk Kim, Daejeon (KR); Youngsik Eom, Daejeon (KR); Sanggon Kim, Daejeon (KR); Yunah Yu, Daejeon (KR); Hyungsam Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 286 days.

This patent is subject to a terminal disclaimer.

(21) Appl. No.: 16/630,242

(22) PCT Filed: Dec. 7, 2018

(86) PCT No.: PCT/KR2018/015463
§ 371 (c)(1),
(2) Date: Jan. 10, 2020

(87) PCT Pub. No.: WO2019/139257
PCT Pub. Date: Jul. 18, 2019

(65) Prior Publication Data
US 2020/0131315 A1    Apr. 30, 2020

(30) Foreign Application Priority Data
Jan. 9, 2018    (KR) .................. 10-2018-0002877

(51) Int. Cl.
C08J 5/18        (2006.01)
C08G 73/14    (2006.01)
(52) U.S. Cl.
CPC ................ C08G 73/14 (2013.01); C08J 5/18 (2013.01); *C08J 2379/08* (2013.01)
(58) Field of Classification Search
CPC ........ C08G 69/12; C08G 73/10; C08G 73/14; C08J 2379/08; C08J 5/18
See application file for complete search history.

(56) References Cited

U.S. PATENT DOCUMENTS

| | | |
|---|---|---|
| 9,200,117 B2 | 12/2015 | Cho et al. |
| 9,796,816 B2 | 10/2017 | Cho et al. |
| 2008/0124534 A1 | 5/2008 | Sakurai et al. |
| 2012/0296050 A1 | 11/2012 | Cho et al. |
| 2016/0039977 A1 | 2/2016 | Cho et al. |
| 2016/0319076 A1 | 11/2016 | Ju et al. |
| 2017/0145166 A1 | 5/2017 | Jeon et al. |
| 2018/0002486 A1 | 1/2018 | Kim et al. |
| 2018/0002487 A1 | 1/2018 | Yang et al. |

FOREIGN PATENT DOCUMENTS

| | | |
|---|---|---|
| CN | 105111433 A | 12/2015 |
| CN | 106967296 A | 7/2017 |
| JP | 2006-111866 A | 4/2006 |
| KR | 10-2013-0029129 A | 3/2013 |
| KR | 10-1523730 B1 | 5/2015 |
| KR | 10-2015-0076114 A | 7/2015 |
| KR | 10-2015-0113472 A | 10/2015 |
| KR | 10-2016-0059097 A | 5/2016 |
| KR | 10-2016-0081829 A | 7/2016 |
| KR | 10-2016-0081845 A | 7/2016 |
| KR | 10-2017-0136319 A | 12/2017 |
| KR | 10-2018-0001249 A | 1/2018 |
| WO | 2018-004195 A1 | 1/2018 |

OTHER PUBLICATIONS

US 9,163,118 B2, 10/2015, Cho et al. (withdrawn)
International Search Report issued for International Application No. PCT/KR2018/015463 dated Mar. 18, 2019, 4 pages.
Extended European Search Report issued for European Patent Application No. 18899844.7 dated Jul. 10, 2020, 8 pages.

*Primary Examiner* — Lawrence D Ferguson
(74) *Attorney, Agent, or Firm* — Rothwell, Figg, Ernst & Manbeck, P.C.

(57) ABSTRACT

The present invention relates to a polyamide-imide resin film having a low birefringence index, including: a polyamide-imide block copolymer containing an amide repeating unit to which an isophthaloyl group and an aromatic diamine residue are bonded; an imide repeating unit; and a trivalent functional group containing an aromatic tricarbonyl group.

16 Claims, No Drawings

POLYAMIDE-IMIDE RESIN FILM

CROSS-REFERENCE TO RELATED APPLICATION(S)

This application is a 35 U.S.C. § 371 National Phase Entry Application from PCT/KR2018/015463, filed on Dec. 7, 2018, and designating the United States, which claims the benefit of filing date of Korean Patent Application No. 10-2018-0002877 filed with Korean Intellectual Property Office on Jan. 9, 2018, the entire contents of which are incorporated herein by reference.

The present invention relates to a polyamide-imide resin film.

TECHNICAL FIELD

Background Art

An aromatic polyimide resin is a polymer mostly having an amorphous structure, and exhibits excellent heat resistance, chemical resistance, electrical characteristics, and dimensional stability due to its rigid chain structure.

Such a polyimide resin is widely used for electric/electronic materials.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl ($—CF_3$) group; a method of reducing the formation of the CTC by introducing a sulfone ($—SO_2—$) group, an ether ($—O—$) group, or the like into the main chain to make a bent structure; and a method of inhibiting the formation of the resonance structure of the π electrons by introducing an aliphatic cyclic compound, have been proposed.

However, it is difficult for the polyimide resin according to the aforementioned proposals to exhibit sufficient heat resistance due to the bending structure or the aliphatic cyclic compound, and a film produced using the same has limitations in that it exhibits poor mechanical properties.

DETAILED DESCRIPTION OF THE INVENTION

The present invention provides an aromatic polyamide-imide copolymer film exhibiting excellent mechanical properties while being colorless and transparent.

There is provided a polyamide-imide resin film, including: a polyamide-imide block copolymer containing an amide repeating unit to which an isophthaloyl group and an aromatic diamine residue are bonded; an imide repeating unit; and a trivalent functional group containing an aromatic tricarbonyl group, wherein retardation (Rth) in the thickness direction measured at a wavelength of 590 nm is 2000 nm or less.

Hereinafter, a polyamide-imide resin film according to an embodiment of the invention will be described in more detail.

In addition, according to the present disclosure, a polyimide-based film including the above-mentioned polyamide-imide block copolymer is provided.

Unless otherwise specified throughout this specification, the technical terms used herein are only for describing specific embodiments and are not intended to limit the present invention.

The singular forms "a" and "an" are intended to include the plural forms as well, unless the context clearly indicates otherwise.

The term "including" or "comprising" used herein specifies a specific feature, region, integer, step, action, element, and/or component, but does not exclude the addition of a different specific feature, area, integer, step, action, element, component, and/or group.

Terms including ordinal numbers such as "first", "second", etc. are used only for the purpose of distinguishing one component from another component, and are not limited by ordinal numbers.

For instance, a first component may be referred to as a second component, or similarly, the second component may be referred to as the first component, without departing from the scope of the present invention.

According to one embodiment of the present disclosure, a polyamide-imide resin film can be provided, including: a polyamide-imide block copolymer containing an amide repeating unit to which an isophthaloyl group and an aromatic diamine residue are bonded; an imide repeating unit; and a trivalent functional group containing an aromatic tricarbonyl group, wherein retardation (Rth) in the thickness direction measured at a wavelength of 590 nm is 2000 nm or less.

As a result of studies by the present inventors, it has been found through experiments that when a polyamide-imide block copolymer containing an amide repeating unit to which an isophthaloyl group and an aromatic diamine residue are bonded, an imide repeating unit, and a trivalent functional group containing an aromatic tricarbonyl group is used, it is possible to provide a polyamide-imide resin film which is colorless and transparent and has excellent mechanical properties and a low birefringence index, thereby completing the present invention.

Specifically, as the polyamide-imide block copolymer contains an amide repeating unit to which an isophthaloyl group and an aromatic diamine residue are bonded, it can have a polymer inner structure capable of not only preventing chain packing by including a repeating unit having a bent structure in the main chain, thus reducing charge transfer between aromatic groups (benzene, etc.), but also slightly reducing the chain orientation to decrease the directionality, whereby it is possible to provide a film which is excellent in processability and thus facilitates formation of films, and which is colorless and transparent and has excellent mechanical properties.

In addition, as the polyamide-imide block copolymer includes a trivalent functional group containing an aromatic tricarbonyl group, it can provide a predetermined crosslinking structure or a network structure therein. By the block copolymerization of the repeating units containing it, a rigid and stable network structure can be formed in the copolymer, and such a rigid and stable network structure allows the polyamide-imide block copolymer to exhibit improved mechanical properties while being colorless and transparent.

More specifically, in the polyamide-imide block copolymer, a block containing the amide repeating unit and a block containing the imide repeating unit may be bonded via a trivalent functional group containing the aromatic tricarbonyl group.

The thickness of the polyamide-imide resin film is not particularly limited, but the polyamide-imide resin film may have a thickness of 5 μm to 100 μm in consideration of optical characteristics, mechanical properties, birefringence, and the like of the film.

Further, the retardation (Rth) in the thickness direction measured at a wavelength of 590 nm with respect to the polyamide-imide resin film may be 2000 nm or less, 200 nm to 2000 nm, 300 no to 1500 nm, 400 no to 1200 nm, or 500 no to 1000 nm.

The polyamide-imide resin film may have isotropy.

As the polyamide-imide resin film has retardation (Rth) in the thickness direction measured at a wavelength of 590 nm of 2000 nm or less, it has isotropy and thus has a certain transparency in all directions in optical characteristics, and can have a feature that the reproducibility according to the manufacturing conditions and the thickness is superior to that of anisotropic materials at the time of producing the film.

The thickness-direction retardation (Rth) of the polyamide-imide resin film can be confirmed by a commonly known measurement method and measurement apparatus.

For example, the retardation (Rth) in the thickness direction can be determined using a measuring apparatus manufactured by AXOMETRICS, Inc. under the trade name of AxoScan, Prism Coupler, and the like.

In addition, the retardation (Rth) in the thickness direction can be determined by: inputting a value of a refractive index (589 nm) of the polyamide-imide resin film into the measuring apparatus, then measuring the thickness-direction retardation of the polyamide-imide resin film by using light at a wavelength of 590 nm under conditions of a temperature of 25° C. and a humidity of 40%, and converting the measured value of the thickness-direction retardation thus determined (the value is measured according to the automatic measurement (automatic calculation) of the measuring apparatus) into a retardation value per 10 μm of the thickness of the film.

In addition, the size of the polyimide film as the measurement sample is not particularly limited, as long as it is larger than a light measurement unit (diameter: about 1 cm) of a stage of the measuring apparatus. However, the size may be a length of 76 mm, a width of 52 mm, and a thickness of 13 μm.

The value of the "refractive index (589 nm) of the polyimide film" utilized in the measurement of the thickness-direction retardation (Rth) can be determined by forming an unstretched film including the same kind of polyamide-imide resin film as the polyamide-imide resin film for forming the film to be measured for the retardation, and then measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

Further, when the measurement sample is unstretched, the refractive index in the in-plane direction of the film is the same in any direction in the plane, and measuring this refractive index makes it possible to measure the intrinsic refractive index of the polyamide-imide resin film (further, since the measurement sample is unstretched, Nx=Ny is satisfied, where Nx is a refractive index in a direction of a slow axis in the plane, and Ny is a refractive index in an in-plane direction perpendicular to the direction of the slow axis).

In this way, an unstretched film is utilized to measure the intrinsic refractive index (589 nm) of the polyamide-imide resin film, and the measurement value thus obtained is utilized in the measurement of the above-described thickness-direction retardation (Rth).

Here, the size of the polyamide-imide resin film as a measurement sample is not particularly limited, as long as the size can be utilized in the refractive index-measuring apparatus. The size may be 1 cm square (1 cm in length and width) and 13 μm in thickness.

On the other hand, the polyamide-imide block copolymer may include a first repeating unit represented by the following Chemical Formula 1, and a second repeating unit represented by the following Chemical Formula 2, and optionally, it may further include a third repeating unit represented by the following Chemical Formula 3.

[Chemical Formula 1]

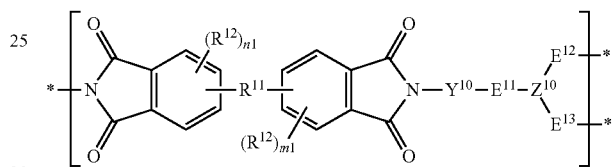

In Chemical Formula 1, each $R^{11}$ is the same as or different from each other in each repeating unit, and each independently represents a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;

each $R^{12}$ independently represents —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently an integer of 0 to 3;

each $Y^{10}$ is the same as or different from each other in each repeating unit, and each independently includes a divalent aromatic organic group having 6 to 30 carbon atoms, wherein the aromatic organic group exists alone, two or more aromatic organic groups are bonded to each other to form a divalent condensed ring, or two or more of the aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^{11}$, $E^{12}$, and $E^{13}$ are each independently a single bond or —NH—; and each $Z^{10}$ is the same as or different from each other in each repeating unit, and each represents a trivalent linking group derived from one or more compounds selected from the group consisting of triacyl halide, tricarboxylic acid, and tricarboxylate.

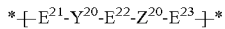 [Chemical Formula 2]

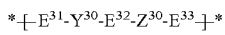 [Chemical Formula 2]

In Chemical Formulae 2 and 3, $Y^{20}$ and $Y^{30}$ are the same as or different from each other in each repeating unit, and each independently includes a divalent aromatic organic group having 6 to 30 carbon atoms, wherein the aromatic organic group exists alone, two or more of the aromatic organic groups are bonded to each other to form a divalent condensed ring, or two or more of the aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^{21}$, $E^{2}$, $E^{23}$, $E^{31}$, $E^{32}$, and $E^{33}$ are each independently a single bond or —NH—;

$Z^{20}$ and $Z^{30}$ are the same as or different from each other in each repeating unit, and each is a divalent linking group in the form of —C(=O)-A-C(=O)— derived from one or more compounds selected from the group consisting of diacyl halide, dicarboxylic acid, and dicarboxylate;

in $Z^{20}$ and $Z^{30}$, A is a divalent aromatic organic group having 6 to 20 carbon atoms, a divalent heteroaromatic organic group having 4 to 20 carbon atoms, a divalent alicyclic organic group having 6 to 20 carbon atoms, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

in $Z^{20}$, two carbonyl groups connected to both sides of A are bonded to each other at a meta position with respect to A; and in $Z^{30}$, two carbonyl groups connected to both sides of A are bonded at a para position to each other with respect to A.

The polyamide-imide block copolymer may have a structure in which a divalent linking group in the form of —C(=O)-A-C(=O)— is introduced into $Z^{20}$ of the second repeating unit and $Z^{30}$ of the third repeating unit, respectively.

In particular, the polyamide-imide block copolymer has both a structure in which two carbonyl groups connected to both sides of A in $Z^{20}$ are bonded to a meta position with respect to A, and a structure in which two carbonyl groups connected to both sides of A in $Z^{30}$ are bonded to the para position with respect to A.

Accordingly, the polyamide-imide block copolymer exhibits excellent processability resulting from bonding at a meta position of the second repeating unit, and at the same time, exhibits excellent mechanical properties (in particular, hardness and modulus) resulting from bonding at a para position of the third repeating unit.

That is, the polyamide-imide block copolymer may include a first repeating unit having an introduced trivalent brancher ($Z^{10}$), a second repeating unit having an introduced group ($Z^{20}$) in which two carbonyl groups are bonded to the meta position, and a third repeating unit having an introduced group ($Z^{30}$) in which two carbonyl groups are bonded to the para position.

Consequently, the polyamide-imide block copolymer is excellent in processability of the resin itself, and therefore, it not only facilitates formation of films using it, but also enables provision of a film having improved mechanical properties while being colorless and transparent.

Hereinafter, each repeating unit contained in the polyamide-imide block copolymer will be described.

(I) First Repeating Unit

[Chemical Formula 1]

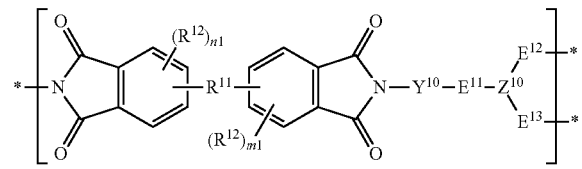

The polyamide-imide block copolymer includes the first repeating unit represented by Chemical Formula 1.

In Chemical Formula 1, each $R^{11}$ is the same as or different from each other in each repeating unit, and each independently represents a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms.

Here, the single bond means a case where $R^{11}$ in Chemical Formula 1 is a chemical bond that simply connects groups on both sides.

The divalent aromatic organic group having 6 to 30 carbon atoms exists alone; two or more aromatic organic groups are bonded to each other to form a divalent condensed ring; or it is a divalent organic group in which two or more aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Specifically, each $R^{11}$ is the same as or different from each other in each repeating unit, and may each independently represent a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—. More specifically, $R^{11}$ may be a single bond or —C(CF$_3$)$_2$—.

In Chemical Formula 1, each $R^{12}$ independently represents —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms.

In Chemical Formula 1, the n1 and m1 are each independently an integer of 0 to 3. Preferably, the n1 and m1 are each independently an integer of 0 to 1.

In Chemical Formula 1, each $Y^{10}$ is the same as or different from each other in each repeating unit, and each independently includes a divalent aromatic organic group having 6 to 30 carbon atoms.

Here, the divalent aromatic organic group exists alone; two or more aromatic organic groups are bonded to each other to form a condensed ring; or two or more aromatic organic groups may be linked by a single bond, a fluorenyl group, —O—, —S—, —C(=O)—, —CH(OH)—, —S(=O)₂—, —Si(CH₃)₂—, —(CH₂)$_p$— (wherein 1≤p≤10), —(CF₂)$_q$— (wherein 1≤q≤10), —C(CH₃)₂—, —C(CF₃)₂—, or —C(=O)NH—.

Specifically, $Y^{10}$ may be a divalent organic group represented by the following structural formula:

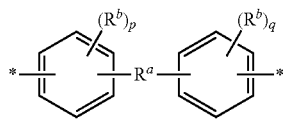

wherein, in the above structural formula, $R^a$ is a single bond, a fluorenyl group, —O—, —S—, —C(=O)—, —CH(OH)—, —S(=O)₂—, —Si(CH₃)₂—, —(CH₂)$_p$— (wherein 1≤p≤10), —(CF₂)$_q$— (wherein 1≤q≤10), —C(CH₃)₂—, —C(CF₃)₂—, or —C(=O)NH—;

each $R^b$ is independently —H, —F, —Cl, —Br, —I, —CF₃, —CCl₃, —CBr₃, —Cl₃, —NO₂, —CN, —COCH₃, —CO₂C₂H₅, a silyl group having three aliphatic organic groups having 1 to 10 carbon atoms, an aliphatic organic group having 1 to 10 carbon atoms, or an aromatic organic group having 6 to 20 carbon atoms; and p and q are each independently an integer of 1 to 4.

In Chemical Formula 1, $E^{11}$, $E^{12}$, and $E^{13}$ are each independently a single bond or —NH—. Here, the single bond means a case where $E^{11}$, $E^{12}$, and $E^{13}$ simply connect groups on both sides or repeating units.

In Chemical Formula 1, $Z^{10}$ is a brancher having three reactive substituents, which are the same as or different from each other in each repeating unit, and each represents a trivalent linking group derived from one or more compounds selected from the group consisting of triacyl halide, tricarboxylic acid, and tricarboxylate.

Specifically, $Z^{10}$ may be a trivalent linking group derived from one or more compounds which are selected from the group consisting of an aromatic triacyl halide having 6 to 20 carbon atoms, an aromatic tricarboxylic acid having 6 to 20 carbon atoms, an aromatic tricarboxylate having 6 to 20 carbon atoms, an N-containing heteroaromatic triacyl halide having 4 to 20 carbon atoms, an N-containing heteroaromatic tricarboxylic acid having 4 to 20 carbon atoms, an N-containing heteroaromatic tricarboxylate having 4 to 20 carbon atom, an alicyclic triacyl halide having 6 to 20 carbon atoms, an alicyclic tricarboxylic acid having 6 to 20 carbon atoms, and an alicyclic tricarboxylate having 6 to 20 carbon atoms.

More specifically, $Z^{10}$ may be a group selected from the group represented by the following structural Formulae:

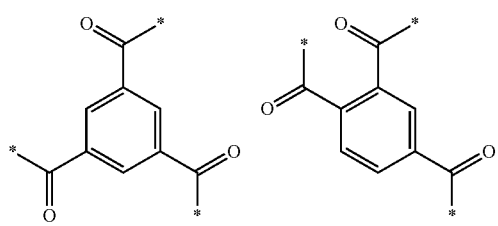

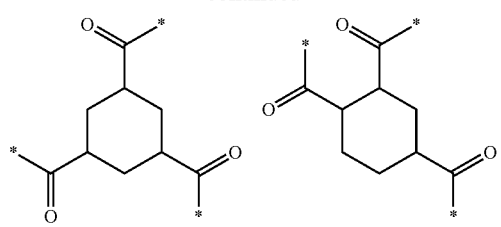

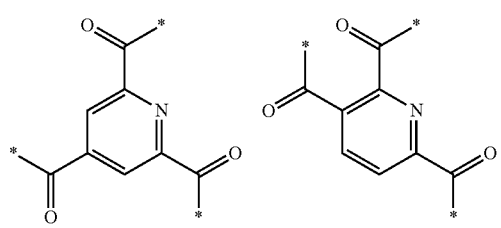

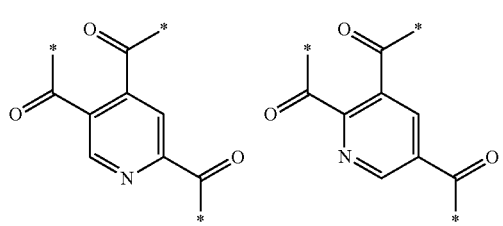

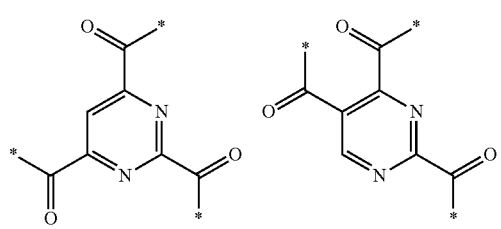

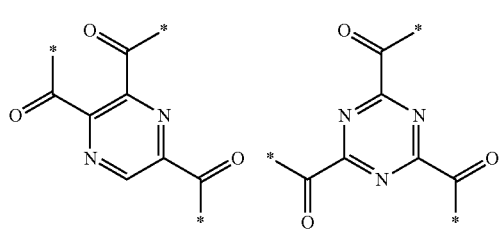

For example, $Z^{10}$ may be a trivalent linking group derived from one or more compounds which are selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

More specifically, the first repeating unit may include a repeating unit represented by the following Chemical Formula 1-a:

[Chemical Formula 1-a]

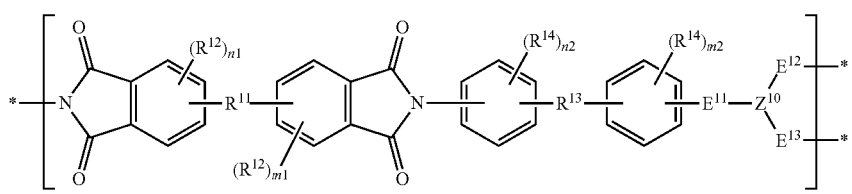

wherein, in Chemical Formula 1-a, each $R^{11}$ is the same as or different from each other in each repeating unit, and each independently represents a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;

$R^{12}$ and $R^{14}$ each independently represent —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon Further, in Chemical Formula 1-a, $R^{11}$ and $R^{13}$ are the same as or different from each other in each repeating unit, and each independently represent a single bond or —C(CF$_3$)$_2$—; and $Z^{10}$ may be a trivalent linking group derived from one or more compounds which are selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

Preferably, the first repeating unit may include a repeating unit represented by the following Chemical Formulae 1-b and 1-c:

[Chemical Formulae 1-b]

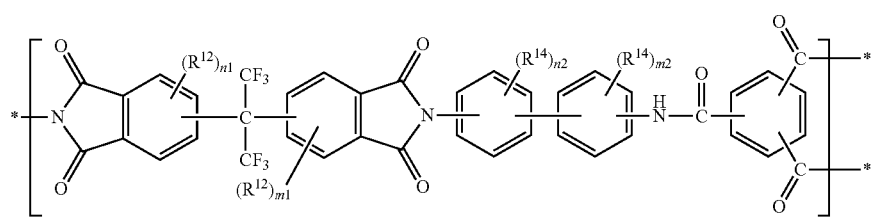

[Chemical Formulae 1-c]

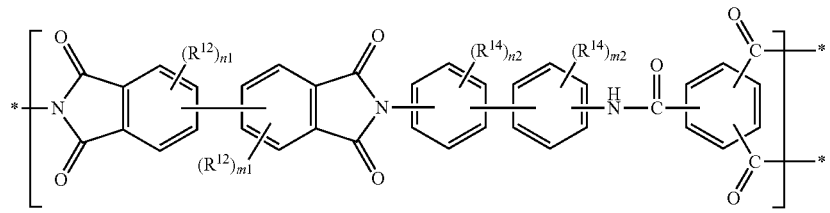

atoms, an aliphatic organic group having 1 to 10 carbon atoms, or an aromatic organic group having 6 to 20 carbon atoms;

each $R^{13}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

n1 and m1 are each independently an integer of 0 to 3;

n2 and m2 are each independently an integer of 1 to 4;

$E^{11}$, $E^{12}$, and $E^{13}$ are each independently a single bond or —NH—; and each $Z^{10}$ is the same as or different from each other in each repeating unit, and each represents a trivalent linking group derived from one or more compounds selected from the group consisting of triacyl halide, tricarboxylic acid, and tricarboxylate.

wherein, in Chemical Formulae 1-b and 1-c, $R^{12}$ and $R^{14}$ independently represent —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently an integer of 0 to 3; and n2 and m2 are each independently an integer of 1 to 4.

(ii) Second Repeating Unit

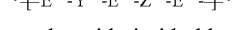 [Chemical Formula 2]

The polyamide-imide block copolymer includes the second repeating unit represented by Chemical Formula 2.

In Chemical Formula 2, each $Y^{20}$ is the same as or different from each other in each repeating unit, and each independently includes a divalent aromatic organic group having 6 to 30 carbon atoms.

Here, the divalent aromatic organic group exists alone; two or more aromatic organic groups are bonded to each other to form a divalent condensed ring; or two or more aromatic organic groups may be linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, Y$^{20}$ may be a divalent organic group represented by the following structural formula:

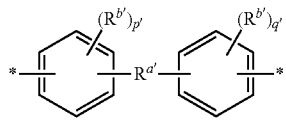

In the above structural formula,

R$^{a'}$ is a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each R$^{b'}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms; and p' and q' are each independently an integer of 1 to 4.

In Chemical Formula 2, E$^{21}$, E$^{22}$, and E$^{23}$ are each independently a single bond or —NH—. Here, the single bond means a case where E$^{21}$, E$^{22}$, and E$^{23}$ simply connect groups on both sides or repeating units.

In Chemical Formula 2, each Z$^{20}$ is the same as or different from each other in each repeating unit, and each is a divalent linking group in the form of —C(=O)-A-C(=O)— derived from one or more compounds which are selected from the group consisting of diacyl halide, dicarboxylic acid, and dicarboxylate.

A is a divalent aromatic organic group having 6 to 20 carbon atoms, or a divalent heteroaromatic organic group having 4 to 20 carbon atoms, a divalent alicyclic organic group having 6 to 20 carbon atoms, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In particular, in Z$^{20}$, two carbonyl groups connected to both sides of A are bonded at a meta position to each other with respect to A.

Specifically, Z$^{20}$ may be a group selected from the group consisting of the following structural Formulae:

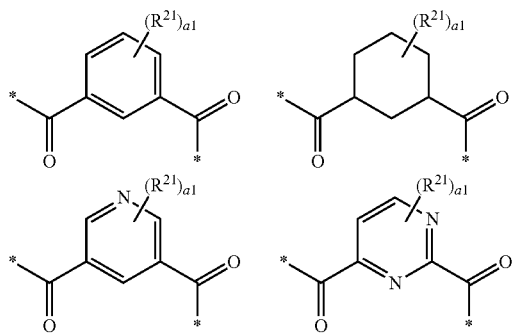

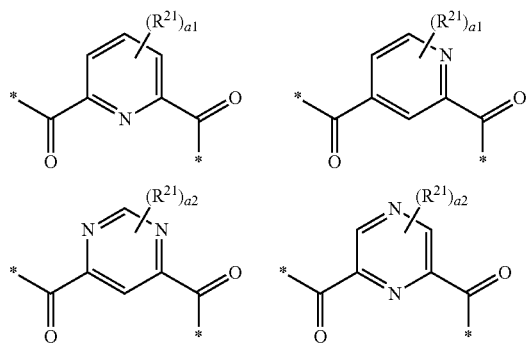

wherein, in the above structural Formulae,

R$^{21}$ is —H, —F, —Cl, —Br, —I, a silyl group having three aliphatic organic groups having 1 to 10 carbon atoms, an aliphatic organic group having 1 to 10 carbon atoms, or an aromatic organic group having 6 to 20 carbon atoms, a1 is an integer of 0 to 3, and a2 is an integer of 0 to 2.

More specifically, Z$^{20}$ may be a group selected from the group represented by the following structural Formulae:

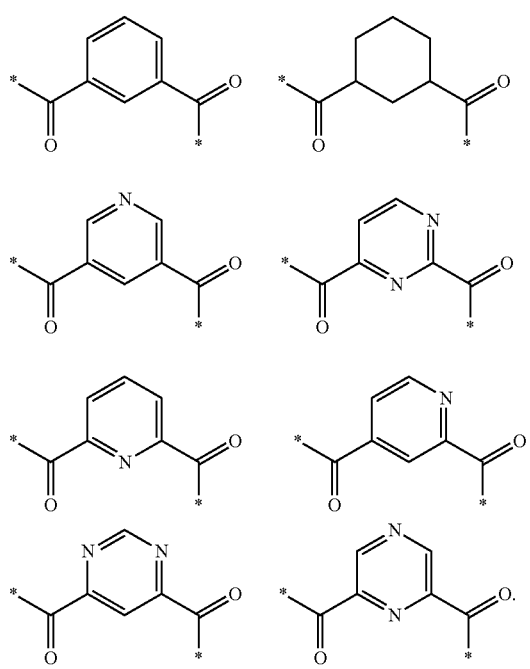

For example, Z$^{20}$ may be a divalent linking group derived from one or more compounds which are selected from isophthaloyl dichloride (IPC), isophthalic acid, cyclohexane-1,3-dicarbonyl chloride, cyclohexane-1,3-dicarboxylic acid, pyridine-3,5-dicarbonyl chloride, pyridine-3,5-dicarboxylic acid, pyrimidine-2,6-dicarbonyl chloride), and pyrimidine-2,6-dicarboxylic acid.

Preferably, the second repeating unit may include a repeating group represented by the following Chemical Formula 2-a:

[Chemical Formula 2-a]

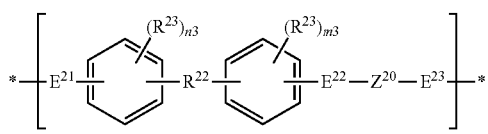

wherein, in Chemical Formula 2-a, each $R^{22}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^{23}$ independently represents —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n3 and m3 are each independently an integer of 1 to 4;

$E^{21}$, $E^2$, and $E^3$ are each independently a single bond or —NH—; and $Z^{20}$ is a group selected from the group represented by the following structural Formulae:

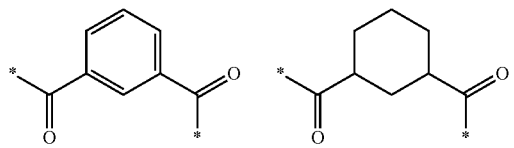

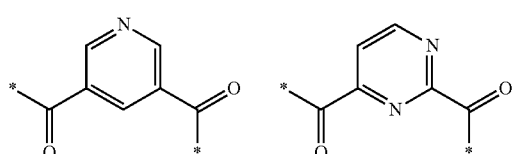

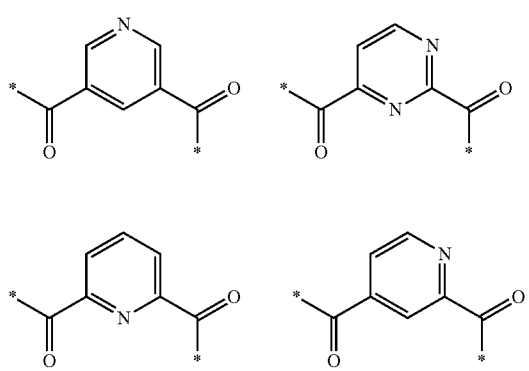

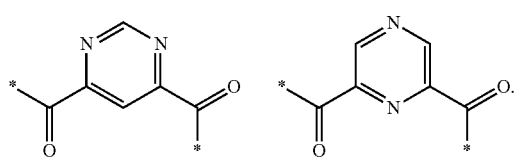

More preferably, the second repeating unit may include a repeating group represented by the following Chemical Formula 2-b:

[Chemical Formula 2-b]

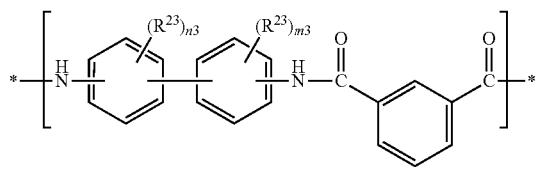

wherein, in Chemical Formula 2-b, each $R^{23}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms; and n3 and m3 are each independently an integer of 1 to 4.

(iii) Third Repeating Unit $$*\!\!-\!\!\left[\!-\!E^{31}\!-\!Y^{30}\!-\!E^{32}\!-\!Z^{30}\!-\!E^{33}\!-\!\right]\!\!-\!\!*$$ [Chemical Formula 3]

The polyamide-imide block copolymer includes the third repeating unit represented by Chemical Formula 3 together with the second repeating unit represented by Chemical Formula 2.

In Chemical Formula 3, each $Y^{30}$ is the same as or different from each other in each repeating unit, and each independently includes a divalent aromatic organic group having 6 to 30 carbon atoms.

Here, the divalent aromatic organic group exists alone; two or more aromatic organic groups are bonded to each other to form a divalent condensed ring; or two or more aromatic organic groups may be linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, $Y^{30}$ may be a divalent organic group represented by the following structural formula:

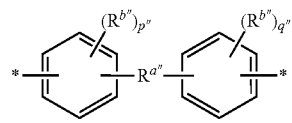

wherein, in the above structural formula, $R^{a''}$ is a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^{b''}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms; and p" and q" are each independently an integer of 1 to 4.

In Chemical Formula 3, $E^{31}$, $E^{32}$, and $E^{33}$ are each independently a single bond or —NH—. Here, the single bond means a case where $E^{31}$, $E^{32}$, and $E^{33}$ simply connect groups on both sides or repeating units.

In Chemical Formula 3, each $Z^{30}$ is the same as or different from each other in each repeating unit, and each is a divalent linking group in the form of —C(=O)-A-C(=O)— derived from one or more compounds which are selected from the group consisting of diacyl halide, dicarboxylic acid, and dicarboxylate.

A is a divalent aromatic organic group having 6 to 20 carbon atoms, a divalent heteroaromatic organic group having 4 to 20 carbon atoms, a divalent alicyclic organic group having 6 to 20 carbon atoms, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In particular, in $Z^{30}$, two carbonyl groups connected to both sides of A are bonded at a para position to each other with respect to A.

Specifically, $Z^{30}$ may be a group selected from the group consisting of the following structural Formulae:

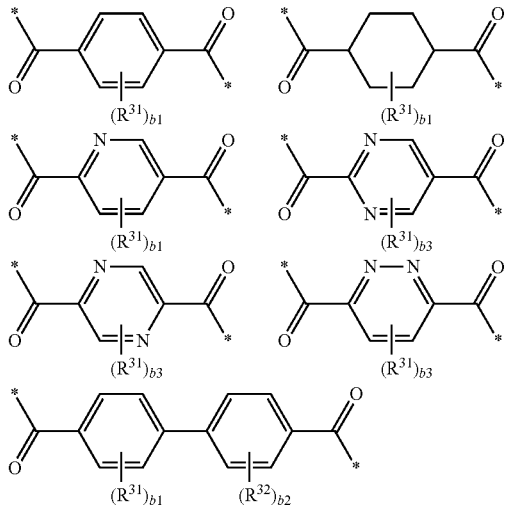

wherein, in the above structural Formulae,
$R^{31}$ and $R^{32}$ are each independently —H, —F, —Cl, —Br, —I, a silyl group having three aliphatic organic groups having 1 to 10 carbon atoms, an aliphatic organic group having 1 to 10 carbon atoms, or an aromatic organic group having 6 to 20 carbon atoms;
b1 and b2 are each independently an integer of 0 to 3; and b3 is an integer of 0 to 2.

More specifically, $Z^{30}$ may be a group selected from the following structural Formulae:

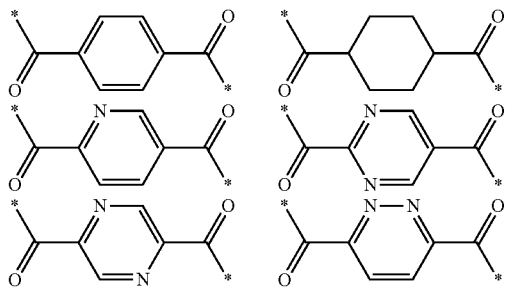

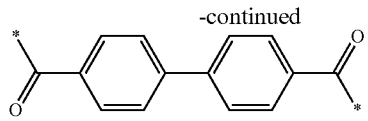

For example, $Z^{30}$ may be a divalent linking group derived from one or more compounds which are selected from the group consisting of terephthaloyl chloride (TPC), terephthalic acid, cyclohexane-1,4-dicarbonyl chloride, cyclohexane-1,4-dicarboxylic acid, pyridine-2,5-dicarbonyl chloride, pyridine-2,5-dicarboxylic acid, pyrimidine-2,5-dicarbonyl chloride, pyrimidine-2,5-dicarboxylic acid, 4,4'-biphenyldicarbonyl chloride (BPC), and 4,4'-biphenyldicarboxylic acid.

Preferably, the third repeating unit may include a repeating unit represented by the following Chemical Formula 3-a:

[Chemical Formulae 3-a]

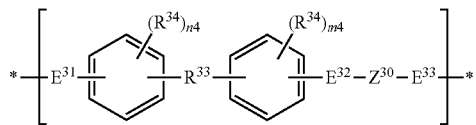

wherein, in Chemical Formula 3-a,
each $R^{33}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$— or —C(=O)NH—;
each $R^{34}$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;
n4 and m4 are each independently an integer of 1 to 4;
$E^{31}$, $E^{32}$, and $E^{33}$ are each independently a single bond or —NH—; and
$Z^{30}$ is a group selected from the group represented by the following structural Formulae:

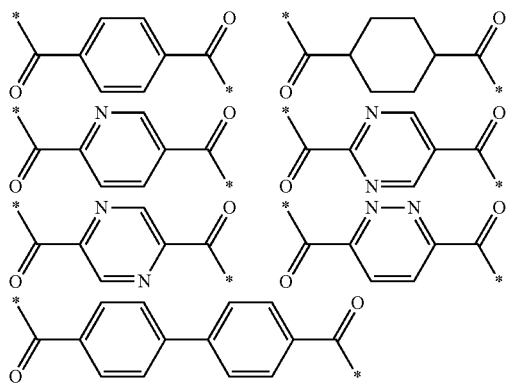

More preferably, the third repeating unit may include a repeating unit represented by the following Chemical Formulae 3-b or 3-c:

[Chemical Formulae 3-b]

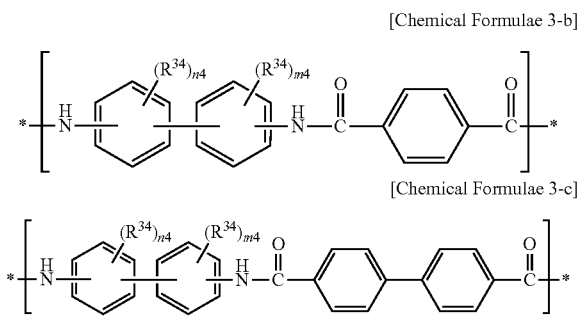

[Chemical Formulae 3-c]

wherein, in Chemical Formulae 3-b and 3-c, each $R^{34}$ is independently —H, —F, —Cl, —Br, —I, —$CF_3$, —$CCl_3$, —$CBr_3$, —$Cl_3$, —$NO_2$, —CN, —$COCH_3$, —$CO_2C_2H_5$, a silyl group having three aliphatic organic groups having 1 to 10 carbon atoms, an aliphatic organic group having 1 to 10 carbon atoms, or an aromatic organic group having 6 to 20 carbon atoms; and n4 and m4 are each independently an integer of 1 to 4.

According to an embodiment of the invention, the presence of the second repeating unit represented by Chemical Formula 2 and the third repeating unit represented by Chemical Formula 3 in the polyamide-imide block copolymer can be confirmed by NMR spectroscopy.

For example, the polyamide-imide block copolymer may show $^1$H NMR spectrum (300 MHz, DMSO-d6, standard TMS) having at least one peak within a δ range of 10.80 ppm or more and 11.00 ppm or less, and at least one peak within a δ range of 10.60 ppm or more and 10.80 ppm or less.

That is, in the $^1$H NMR spectrum of the polyamide-imide block copolymer, the peak according to $Z^{20}$ (including two carbonyl groups bonded to a meta position) of the second repeating unit may be observed within the δ range of 10.80 ppm or more and 11.00 ppm or less; and the peak according to $Z^{30}$ (including two carbonyl groups bonded to a para position) of the third repeating unit may be observed within the δ range of 10.60 ppm or more and 10.80 ppm or less.

In the polyamide-imide block copolymer, the molar ratio of the third repeating unit to the second repeating unit may be 0.5 to 3.

The polyamide-imide block copolymer containing the first repeating unit, the second repeating unit and the third repeating unit at the above-mentioned molar ratio at the same time can be expected to have an effect of improving transparency of the film mainly attributable to the first repeating unit having an introduced brancher ($Z^1$), an effect of improving the processability of the film mainly attributable to the second repeating unit having an introduced $Z^2$ in which two —C(=O)— are located at a meta position, and an effect of improving the mechanical properties (hardness and modulus) mainly attributable to the third repeating unit having an introduced $Z^3$ in which two —C(=O)— are located at a para position.

Further, the polyamide-imide block copolymer has a rigid and stable network structure, and thus can have a higher molecular weight than a general linear polyimide resin.

Specifically, the polyamide-imide block copolymer has a weight average molecular weight of 100,000 to 5,000,000 g/mol, preferably 200,000 to 1,000,000 g/mol, more preferably 300,000 to 750,000 g/mol, and even more preferably 500,000 to 650,000 g/mol.

In addition, the polyamide-imide block copolymer may exhibit a yellowness index (Y.I.) of 3.0 or less, 2.90 or less, 2.80 or less, 2.70 or less, 2.60 or less, or 2.55 or less as measured for a specimen having a thickness of 30±2 Cm according to ASTM D1925.

The polyamide-imide resin film can be used as material for various molded articles requiring high mechanical properties together with colorless transparency.

For example, the polyimide-based film containing the polyamide-imide block copolymer may be applied to substrates for displays, protective films for displays, touch panels, cover films for flexible or foldable devices, and the like.

Meanwhile, the polyimide-based film can be produced by a conventional method such as a dry method or a wet method using the polyamide-imide block copolymer. For example, the polyimide-based film may be obtained by coating a solution containing the copolymer on an arbitrary support to form a film, and then evaporating the solvent from the film to dry it.

If necessary, stretching and heat treating the polyimide-based film may be carried out.

As the polyimide-based film is produced using the polyamide-imide block copolymer, it can exhibit excellent mechanical properties while being colorless and transparent.

Specifically, the polyimide-based film may exhibit a pencil hardness of an HB grade or higher as measured according to ASTM D3363.

In addition, the polyamide-imide block copolymer may exhibit a yellowness index (Y.I.) of 3.0 or less, 2.90 or less, 2.80 or less, 2.70 or less, 2.60 or less, or 2.55 or less as measured for a specimen having a thickness of 50±2 μm according to ASTM D1925.

Advantageous Effects

According to the present invention, a polyamide-imide resin film having excellent mechanical properties while being colorless and transparent can be provided. Such a polyamide-imide resin film can be applied to substrates for displays, protective films for displays, touch panels, and cover films for flexible or foldable devices due to the above-described properties.

DETAILED DESCRIPTION OF THE EMBODIMENTS

Hereinafter, preferred examples are presented to facilitate understanding of the present invention. However, the following examples are given for illustrative purposes only, and the scope of the present invention is not intended to be limited to or by these examples.

Example 1

3.203 g (1.01 eq., 0.0101 mol) of 2,2'-bis(trifluoromethyl)benzidine; 4.3647 g (0.9825 eq., 0.009825 mol) of 4,4'-(hexafluoroisopropylidene)diphthalic anhydride; 0.0133 g (0.005 eq., 0.00005 mol) of 1,3,5-benzenetricarbonyl trichloride; and 73 ml of N,N-dimethylacetamide were placed in a 250 mL round flask equipped with a Dean-Stark apparatus and a condenser, and the mixture was stirred at 0° C. under a nitrogen atmosphere to carry out a polymerization reaction.

After 4 hours, to the product of the polymerization reaction, 9.575 g (2.99 eq., 0.0299 mol) of 2,2'-bis(trifluoromethyl)benzidine; 6.1109 g (3.01 eq., 0.0301 mol) of isophthaloyl dichloride; and 66 ml of N,N-dimethylacetamide were added, and the mixture was stirred at room temperature under a nitrogen atmosphere and subjected to a polymerization reaction for 4 hours.

To the polyamic acid solution obtained by the polymerization reaction, 14 ml of acetic anhydride and 12 ml of pyridine were added, and the mixture was stirred in an oil bath at a temperature of 40° C. for 15 hours to carry out a chemical imidization reaction.

After completion of the reaction, the solid content was precipitated using water and ethanol, and the precipitated solid component was filtered and then dried under vacuum at 100° C. for 6 hours or more to obtain a polyamide-imide block copolymer having the following repeating units (weight average molecular weight of 500,000 g/mol).

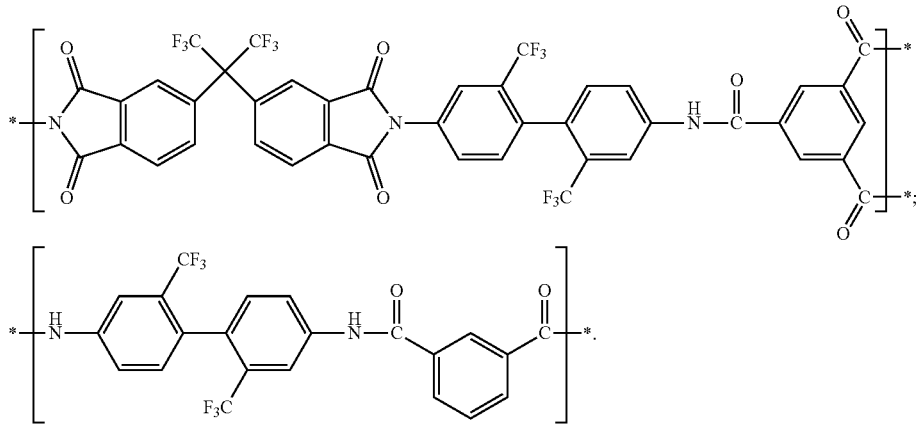

Comparative Example 1

4.851 g (1.01 eq., 0.01515 mol) of 2,2'-bis(trifluoromethyl)benzidine; 6.546 g (0.9825 eq., 0.01474 mol) of 4,4'-(hexafluoroisopropylidene)diphthalic anhydride; 0.0199 g (0.005 eq., 0.000075 mol) of 1,3,5-benzenetricarbonyl trichloride; and 58 ml of N,N-dimethylacetamide were placed in a 250 mL round flask equipped with a Dean-Stark apparatus and a condenser, and the mixture was stirred at 0° C. under a nitrogen atmosphere to carry out a polymerization reaction.

After 4 hours, to the product of the polymerization reaction, 4.755 g (0.99 eq., 0.01485 mol) of 2,2-bis(trifluoromethyl)benzidine; 3.075 g (1.01 eq., 0.0101 mol) of terephthaloyl chloride; and 120 ml of N,N-dimethylacetamide were added, and the mixture was stirred at room temperature under a nitrogen atmosphere and subjected to a polymerization reaction for 4 hours.

To the polyamic acid solution obtained by the polymerization reaction, 14 ml of acetic anhydride and 12 ml of pyridine were added, and the mixture was stirred in an oil bath at a temperature of 40° C. for 15 hours to carry out a chemical imidization reaction.

After completion of the reaction, the solid content was precipitated using water and ethanol, and the precipitated solid component was filtered and then dried at 100° C. under vacuum for 6 hours or more to obtain a polyamide-imide block copolymer having the following repeating units (weight average molecular weight of 300,000 g/mol).

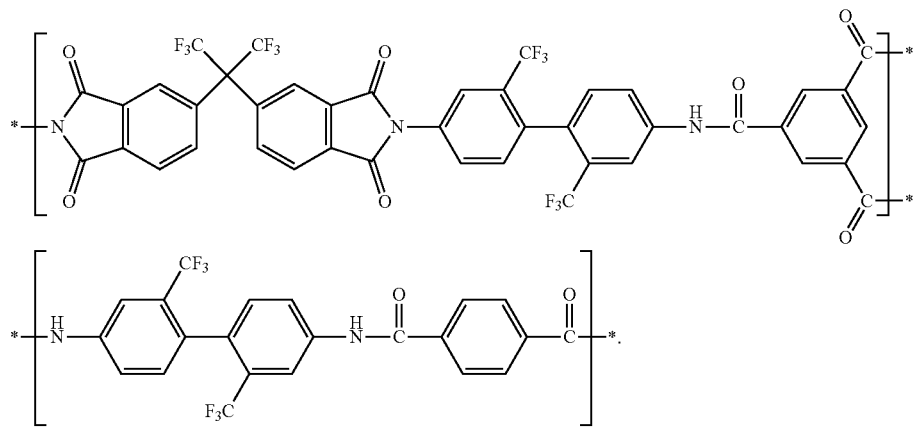

Example 2

The copolymer obtained in Example 1 was dissolved in N,N-dimethylacetamide to prepare an about 10% (w/v) polymer solution. The polymer solution was poured on a glass plate heated to 40° C., and the polymer solution was cast to a thickness of 1200 μm using a film applicator and dried for 60 minutes.

The mixture was slowly heated from 120° C. to 200° C. for 4 hours under a nitrogen purge (maintained at 200° C. for 120 minutes), and then gradually cooled to obtain a film having a thickness of 30±2 In that was peeled off from the glass substrate.

Apart from this, a film having a thickness of 50±2 μm was obtained by the above-described method using the polymer solution.

Comparative Example 2

A film having a thickness of 30±2 μm and a film having a thickness of 50±2 μm were respectively obtained in the same manner as in Example 2, except that the copolymer obtained in Comparative Example 1 was used instead of the copolymer obtained in Example 1.

Test Example

The following characteristics were evaluated for the films obtained in the examples and comparative examples, and the results are shown in Table 1 below.

(1) Pencil Hardness

The pencil hardness of a film having a thickness of 30±2 μm was measured in accordance with the ASTM D3363 method (750 gf) using a Pencil Hardness Tester.

Specifically, various hardnesses of pencils were fixed to the tester and passed on the film, and then the decree of occurrence of scratches on the film was observed with the naked eye or with a microscope. When more than 70% of the total passes did not produce scratches, a value corresponding to the hardness of the pencil was evaluated as the pencil hardness of the film.

(2) Mechanical Properties

The elastic modulus (EM, GPa), the ultimate tensile strength (TS, MPa), and the tensile elongation (TE, %) of the films having a thickness of 30±2 μm were measured in accordance with the ASTM D882 method using a universal testing machine.

(3) Yellowness Index (Y.I.)

The yellowness index of the films having a thickness of 30±2 n m was measured in accordance with the ASTM D1925 method using a UV-2600 UV-Vis Spectrometer (SHIMADZU).

(4) Haziness

The haziness of the films having a thickness of 30±2 Inn was measured in accordance with the ASTM D1003 method using a COH-400 Spectrophotometer (NIPPON DENSHOKU INDUSTRIES).

(5) Folding Endurance

The folding endurance of the films was evaluated using an MIT type of folding endurance tester. Specifically, a specimen (1 cm*7 cm) of the film was loaded into the folding endurance tester, and folded to an angle of 135° at a rate of 175 rpm on the left and right sides of the specimen, with a radius of curvature of 0.8 mm and a load of 250 g, until the specimen was bent and fractured. The number of reciprocating bending cycles was measured as the folding endurance.

(6) Processablility

The degree of transparency of the film having a thickness of 50±2 μm as compared with the film having a thickness of 30±2 μm was observed with the naked eye.

When the transparency indicated by the film having a thickness of 50±2 μm was equal to that of the film having a thickness of 30±2 μm, the film was evaluated as having good processability ("0"), and when the transparency was degraded (for example, was opaque), the film was evaluated as having bad processability ("X").

(7) Retardation (Rth) in Thickness Direction

The retardation (Rth) in the thickness direction was determined by directly using the polymer film (length: 76 mm, width: 52 mm, and thickness: 13 μm) prepared in each of the examples and comparative examples as a measuring sample, using a measuring apparatus manufactured by AXOMETRICS, Inc. under the trade name of AxoScan, inputting a value of a refractive index (the refractive index at a wavelength of 589 nm of the film obtained by the measurement of the refractive index described above) of each polymer film into the measuring apparatus, measuring the thickness-direction retardation by using light at a wavelength of 590 nm under conditions of a temperature of 25° C. and a humidity of 40%; and then converting the measured value of the thickness-direction retardation thus obtained (the value was measured according to the automatic measurement of the measuring apparatus) into a retardation value per 10 μm of the thickness of the film.

TABLE 1

| | Film | |
|---|---|---|
| Copolymer | Example 2 Example 1 | Comparative Example 2 Comparative Example 1 |
| Rth | 853 | 3138 |
| Pencil hardness | F | F (H) |
| Elastic modulus (GPa) | 2.41 | 3.48 |
| Tensile elongation (%) | 16.8 | 7.7 |
| Yellowness Index | 1.77 | 2.22 |
| Haze | 0.7 | 1.14 |
| Processability | ○ | X |

Referring to Table 1 above, it was confirmed that the polyamide-imide resin film of Example 2 had low yellowness index and haze and thus had colorless and transparent optical characteristics, and further exhibited a low level of elastic modulus, high tensile elongation, and the like together with high pencil hardness, thus having excellent mechanical properties.

On the other hand, it was confirmed that the polymer film of Comparative Example 2 had a high yellowness index and haze value, and thus had a higher elastic modulus and lower tensile elongation while being closer to a colored film, as compared with that of the film of Example 2, thus having bad processability.

The invention claimed is:

1. A polyamide-imide resin film comprising: a polyamide-imide block copolymer containing
   an amide repeating unit having an isophthaloyl group and an aromatic diamine residue;
   an imide repeating unit; and
   a trivalent functional group containing an aromatic tricarbonyl group,
   wherein retardation (Rth) in the thickness direction measured at a wavelength of 590 nm is 2000 nm or less.

2. The polyamide-imide resin film according to claim 1, wherein
   a block containing the amide repeating unit and a block containing the imide repeating unit are bonded via the trivalent functional group containing the aromatic tricarbonyl group.

3. The polyamide-imide resin film according to claim 1, wherein
   the polyamide-imide resin film has isotropy.

4. The polyamide-imide resin film according to claim 1, wherein
   the polyamide-imide resin film has a thickness of 5 μm to 100 μm.

5. The polyamide-imide resin film according to claim 1, wherein
the polyamide-imide block copolymer includes a first repeating unit represented by Chemical Formula 1 and a second repeating unit represented by Chemical Formula 2:

[Chemical Formula 1]

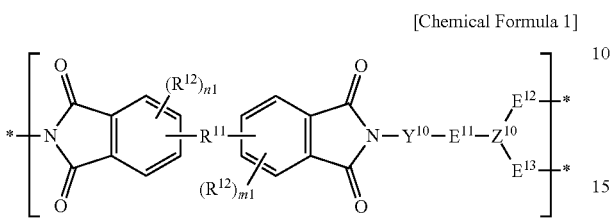

wherein, in the Chemical Formula 1,
each $R^{11}$ is the same as or different from each other in each repeating unit, and each independently represents a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;
each $R^{12}$ independently represents —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;
n1 and m1 are each independently an integer of 0 to 3;
each $Y^{10}$ is the same as or different from each other in each repeating unit, and each independently includes a divalent aromatic organic group having 6 to 30 carbon atoms, wherein the aromatic organic group exists alone, two or more aromatic organic groups are bonded to each other to form a divalent condensed ring, or two or more of the aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;
$E^{11}$, $E^{12}$, and $E^{13}$ are each independently a single bond or —NH—; and
each $Z^{10}$ is the same as or different from each other in each repeating unit, and each represents a trivalent linking group derived from one or more compounds selected from the group consisting of triacyl halide, tricarboxylic acid, and tricarboxylate,

*—[E$^{21}$-Y$^{20}$-E$^{22}$-Z$^{20}$-E$^{23}$]—*  [Chemical Formula 2]

wherein, in the Chemical Formula 2,
each $Y^{20}$ is the same as or different from each other in each repeating unit, and each independently includes a divalent aromatic organic group having 6 to 30 carbon atoms, wherein the aromatic organic group exists alone, two or more of the aromatic organic groups are bonded to each other to form a divalent condensed ring, or two or more of the aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;
$E^{21}$, $E^{22}$, and $E^{23}$ are each independently a single bond or —NH—;
each $Z^{20}$ is the same as or different from each other in each repeating unit, and each is a divalent linking group in the form of —C(=O)-A-C(=O)— derived from one or more compounds selected from the group consisting of diacyl halide, dicarboxylic acid, and dicarboxylate;
in $Z^{20}$, A is a divalent aromatic organic group having 6 to 20 carbon atoms, a divalent heteroaromatic organic group having 4 to 20 carbon atoms, a divalent alicyclic organic group having 6 to 20 carbon atoms, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and
in $Z_{20}$, two carbonyl groups connected to both sides of A are bonded at a meta position to each other with respect to A.

6. The polyamide-imide resin film according to claim 5, wherein
the first repeating unit includes a repeating unit represented by Chemical Formula 1-a:

[Chemical Formula 1-a]

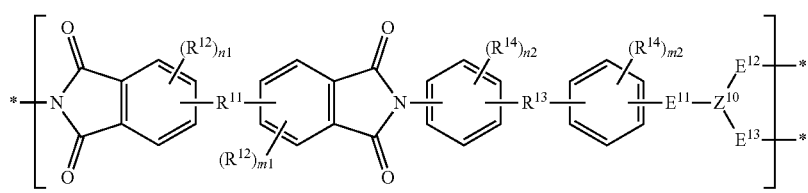

wherein, in the Chemical Formula 1-a,
each $R^{11}$ is the same as or different from each other in each repeating unit, and each independently represents a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a divalent aromatic organic group having 6 to 30 carbon atoms;
$R^{12}$ and $R^{14}$ each independently represent —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;
each $R^{13}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

n1 and m1 are each independently an integer of 0 to 3;

n2 and m2 are each independently an integer of 1 to 4;

E$^{11}$, E$^{12}$, and E$^{13}$ are each independently a single bond or —NH—; and each Z$^{10}$ is the same as or different from each other in each repeating unit, and each represents a trivalent linking group derived frog one or more compounds selected from the group consisting of triacyl halide, tricarboxylic acid, and tricarboxylate.

7. The polyamide-imide resin film according to claim 6, wherein:

R$^{11}$ and R$^{13}$ are the same as or different from each other in each repeating unit, and each independently represents a single bond or —C(CF$_3$)$_2$—;

Z$^{10}$ is a trivalent linking group derived from one or more compounds which are selected from the group consisting of 1,3,5-benzenetricarbonyl trichloride, 1,2,4-benzenetricarbonyl trichloride, 1,3,5-benzenetricarboxylic acid, 1,2,4-benzenetricarboxylic acid, trimethyl 1,3,5-benzenetricarboxylate, and trimethyl 1,2,4-benzenetricarboxylate.

8. The polyamide-imide resin film according to claim 5, wherein the first repeating unit includes a repeating unit represented by Chemical Formulae 1-b or 1-c:

9. The polyamide-imide resin film according to claim 5, wherein

Z$^{20}$ is a group selected from the group consisting of the following structural formulas:

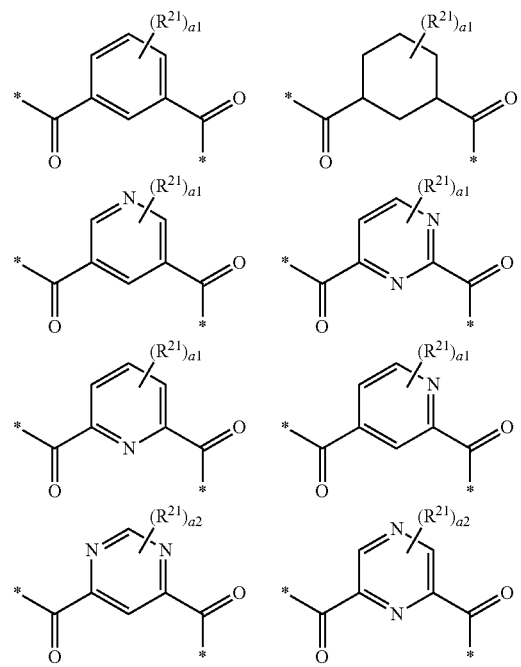

wherein, in the above structural Formulae,

R$^{21}$ is —H, —F, —Cl, —Br, —I, a silyl group having three aliphatic organic groups having 1 to 10 carbon

[Chemical Formulae 1-b]

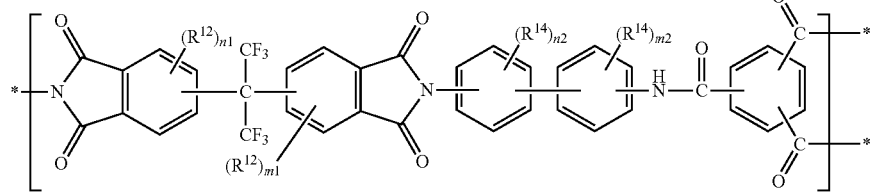

[Chemical Formulae 1-c]

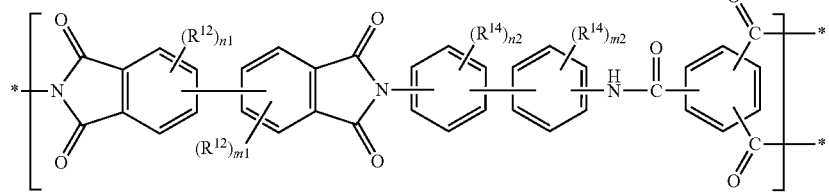

wherein, in the Chemical Formulae 1-b and 1-c,

R$^{12}$ and R$^{14}$ independently represent —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n1 and m1 are each independently an integer of 0 to 3; and
n2 and m2 are each independently an integer of 1 to 4.

atoms, an aliphatic organic group having 1 to 10 carbon atoms, or an aromatic organic group having 6 to 20 carbon atoms, a1 is an integer of 0 to 3, and a2 is an integer of 0 to 2.

10. The polyamide-imide resin film according to claim 5, wherein the second repeating unit includes a repeating group represented by Chemical Formula 2-a:

[Chemical Formula 2-a]

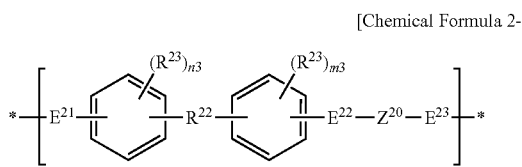

wherein, in the Chemical Formula 2-a, each $R^{22}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

each $R^{23}$ independently represents —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n3 and m3 are each independently an integer of 1 to 4;

$E^{21}$, $E^{22}$, and $E^{23}$ are each independently a single bond or —NH—; and $Z^{20}$ is a group selected from the group represented by the following structural Formulae:

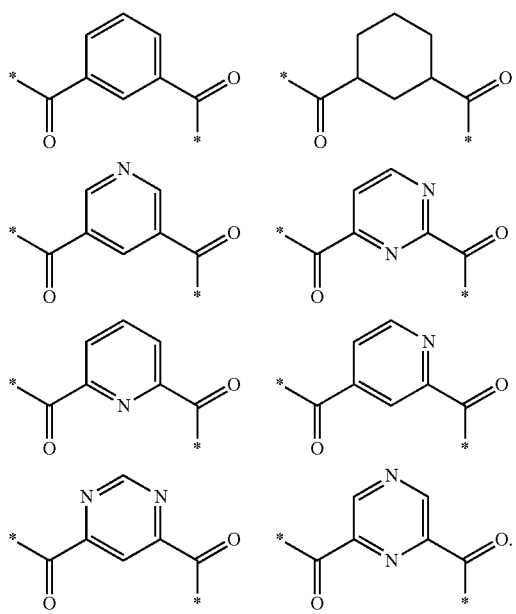

11. The polyimide-imide resin film according to claim 5, wherein the second repeating unit includes a repeating group represented by Chemical Formula 2-b:

[Chemical Formula 2-b]

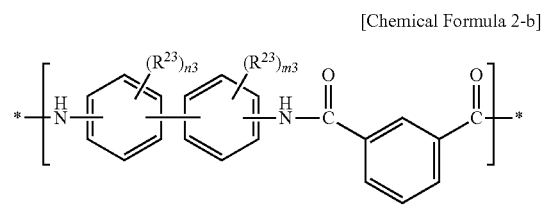

wherein, in the Chemical Formula 2-b, each $R^{23}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms; and n3 and m3 are each independently an integer of 1 to 4.

12. The polyamide-imide resin film according to claim 5, wherein the polyamide-imide block copolymer further includes a third repeating unit represented by Chemical Formula 3:

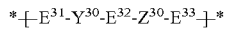

[Chemical Formula 3]

wherein, in the Chemical Formula 3, each $Y^{30}$ is the same as or different from each other in each repeating unit, and each independently includes a divalent aromatic organic group having 6 to 30 carbon atoms, wherein the aromatic organic group exists alone, two or more of the aromatic organic groups are bonded to each other to form a divalent condensed ring, or two or more of the aromatic organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^{31}$, $E^{32}$, and $E^{33}$ are each independently a single bond or —NH—;

each $Z^{30}$ is the same as or different from each other in each repeating unit, and each is a divalent linking group in the form of —C(=O)-A-C(=O)— derived from one or more compounds selected from the group consisting of diacyl halide, dicarboxylic acid, and dicarboxylate;

in $Z^{30}$, A is a divalent aromatic organic group having 6 to 20 carbon atoms, a divalent heteroaromatic organic group having 4 to 20 carbon atoms, a divalent alicyclic organic group having 6 to 20 carbon atoms, or a divalent organic group in which two or more of the organic groups are linked by a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—; and in $Z_{30}$, two carbonyl groups connected to both sides of A are bonded at a para position to each other with respect to A.

13. The polyamide-imide resin film according to claim 12, wherein $Z^{30}$ is a group selected from the group consisting of the following structural Formulae:

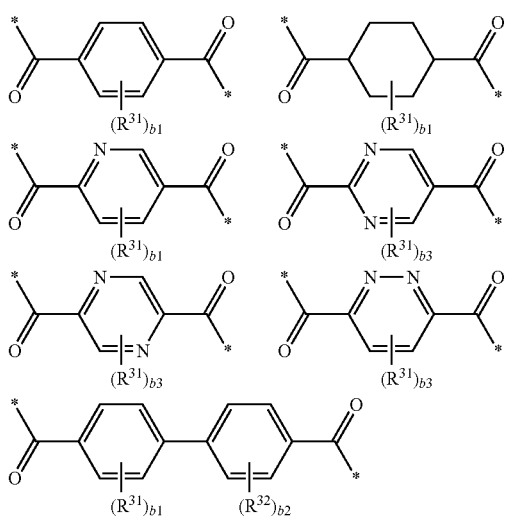

wherein, in the above structural Formulae,
$R^{31}$ and $R^{32}$ are each independently —H, —F, —Cl, —Br, —I, a silyl group having three aliphatic organic groups having 1 to 10 carbon atoms, an aliphatic organic group having 1 to 10 carbon atoms, or an aromatic organic group having 6 to 20 carbon atoms;
b1 and b2 are each independently an integer of 0 to 3; and
b3 is an integer of 0 to 2.

14. The polyamide-imide resin filler according to claim 12, wherein
the third repeating unit includes a repeating unit represented by Chemical Formula 3-a:

[Chemical Formula 3-a]

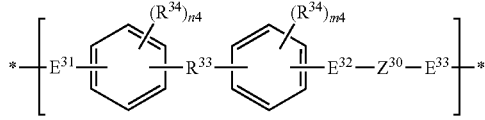

wherein, in the Chemical Formula 3-a,
each $R^{33}$ is the same as or different from each other in each repeating unit, and each independently represents a single bond, a fluorenyl group, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;
each $R^{34}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms;

n4 and m4 are each independently an integer of 1 to 4;
$E^{31}$, $E^{32}$, and $E^{33}$ are each independently a single bond or —NH—; and
$Z^{30}$ is a group selected from the group represented by the following structural Formulae:

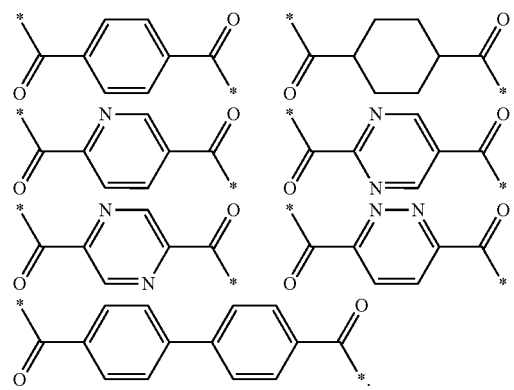

15. The polyamide-imide resin film according to claim 12, wherein
the third repeating unit includes a repeating unit represented by Chemical Formulae 3-b or 3-c:

[Chemical Formulae 3-b]

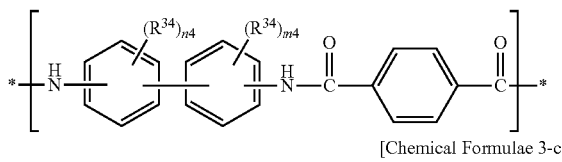

[Chemical Formulae 3-c]

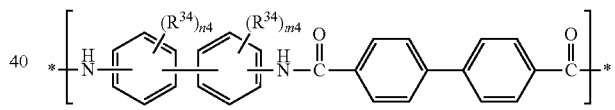

wherein, in the Chemical Formulae 3-b and 3-c,
each $R^{34}$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group having three aliphatic organic groups having 1 to 10 carbon atoms, an aliphatic organic group having 1 to 10 carbon atoms, or an aromatic organic group having 6 to 20 carbon atoms; and
n4 and m4 are each independently an integer of 1 to 4.

16. The polyamide-imide resin film according to claim 12, wherein a molar ratio of the third repeating unit to the second repeating unit s 0.5 to 3.

* * * * *